(12) United States Patent
Hua et al.

(10) Patent No.: US 9,047,319 B2
(45) Date of Patent: Jun. 2, 2015

(54) TAG ASSOCIATION WITH IMAGE REGIONS (75) Inventors: Xian-Sheng Hua, Beijing (CN); Kuiyuan Yang, Beijing (CN); Meng Wang, Singapore (SG); Hong-Jiang Zhang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 12/972,203

(22) Filed: Dec. 17, 2010

(65) Prior Publication Data
US 2012/0158721 A1 Jun. 21, 2012

(51) Int. Cl.
*G06F 17/30* (2006.01)
*G06K 9/00* (2006.01)

(52) U.S. Cl.
CPC .... *G06F 17/30256* (2013.01); *G06F 17/30268* (2013.01)

(58) Field of Classification Search
CPC ..................... G06F 17/30256; G06F 17/30268
USPC .......................................... 707/756; 382/170
See application file for complete search history.

(56) References Cited

U.S. PATENT DOCUMENTS

| | | | |
|---|---|---|---|
| 5,930,783 A | 7/1999 | Li et al. | |
| 6,594,386 B1 | 7/2003 | Golshani et al. | |
| 6,606,623 B1 * | 8/2003 | Hsieh et al. | 707/766 |
| 6,665,442 B2 | 12/2003 | Sekiguchi et al. | |
| 7,065,250 B1 * | 6/2006 | Lennon | 382/224 |
| 7,483,919 B2 * | 1/2009 | Galperin | 707/999.003 |
| 7,590,310 B2 | 9/2009 | Retterath et al. | |
| 2003/0108237 A1 | 6/2003 | Hirata | |
| 2008/0152231 A1 * | 6/2008 | Gokturk et al. | 382/209 |
| 2009/0290802 A1 * | 11/2009 | Hua et al. | 382/225 |
| 2009/0316961 A1 | 12/2009 | Gomez Suarez et al. | |
| 2010/0017389 A1 | 1/2010 | Ogunbona et al. | |

OTHER PUBLICATIONS

Jinbo Bi et al., "A Sparse Support Vector Machine Approach to Region-Based Image Categorization", IEEE CVPR'05 (2005).*
Sudheendra Vijayanarasimhan & Kristen Grauman, "What's It Going to Cost You?: Predicting Effort vs. Informativeness for Multi-Label Image Annotations", IEEE CVPR'09 (Jun. 2009), pp. 2262-2269.*
Zheng-Jun Zha et al., "Joint Multi-Label Multi-Instance Learning for Image Classification", IEEE CVPR'08 (2008).*
Tomasz Malisiewicz & Alexei A. Efros, "Recognition by Association via Learning Per-Examplar Distances", 2008, IEEE, pp. 1-8.*
Li-Jia Li et al., "Towards Total Scene Understanding: Classification, Annotation and Segmentation in an Automatic Framework", 2009, IEEE, pp. 2036-2043.*
Kuiyuan Yang et al., "Tagging Tags", ACM MM'10, Oct. 25-29, 2010, pp. 619-622.*

(Continued)

*Primary Examiner* — Scott A Waldron
(74) *Attorney, Agent, or Firm* — Ladislav Kusnyer; Judy Yee; Mickey Minhas (57) ABSTRACT

A computing device configured to determine that one or more regions of an image are associated with a tag of the image is described herein. The computing device is further configured to determine one or more attribute tags describing at least one of the content or context of the one or more regions. Upon determining the attribute tags, the computing device associates the attribute tags with the tag to enable image searching based on the tag and attribute tags.

20 Claims, 6 Drawing Sheets

(56) References Cited

OTHER PUBLICATIONS

Yang Wang & Greg Mori, "A Discriminitive Latent Model of Image Region and Object Tag Correspondence", Dec. 6-9, 2010, 24th Annual Conference on Neural Information Processing Systems 2010, appearing in Advances in Neural Information Processing Systems 23.*

Kuiyuan Yang et al., "Tag Tagging: Towards More Descriptive Keywords of Image Content", Aug. 2011, IEEE Transactions on Multimedia, vol. 13, No. 4, pp. 662-673.*

Yixin Chen & James Z. Wang, "Image Categorization by Learning and Reasoning with Regions", 2004, Journal of Machine Learning Research, vol. 5, pp. 913-939.*

Ames, et al., "Why We Tag: Motivations for Annotation in Mobile and Online Media", retrieved on Sep. 6, 2010 at <<http://www.stanford.edu/~morganya/research/chi2007-tagging.pdf>>, ACM, Proceedings of Conference on Human Factors in Computing Systems (CHI), San Jose, California, 2007, pp. 971-980.

Andoni, et al., "Near-Optimal Hashing Algorithms for Approximate Nearest Neighbor in High Dimensions", retrieved on Sep. 6, 2010 at <<http://citeseerx.ist.psu.edu/viewdoc/download?doi=10.1.1.91.8372&rep=rep1&type=pdf>>, IEEE, Proceedings of Annual Symposium on Foundations of Computer Science (FOCS), 2006, pp. 459-468.

Christel, et al., "The Use and Utility of High-Level Semantic Features in Video Retrieval", retrieved on Sep. 6, 2010 at <<http://citeseerx.ist.psu.edu/viewdoc/download;jsessionid=31EF920D79CE6F6C0048C01A89F64D15?doi=10.1.1.92.2345&rep=rep1&type=pdf>>, Springer-Verlag Berlin, Lecture Notes in Computer Science vol. 3568, Proceedings of International Conference on Image and Video Retrieval (CIVR), Singapore, 2005, pp. 134-144.

Chua, et al., "NUS-WIDE: A Real-World Web Image Database from National University of Singapore", retrieved on Sep. 6, 2010 at <<http://lms.comp.nus.edu.sg/research/CIVR2009.pdf>>, ACM, Proceedings of International Conference on Image and Video Retrieval (CIVR), Santorini, Greece, Article 48, Jul. 2009, 9 pages.

Farhadi, et al., "Describing Objects by their Attributes", retrieved on Sep. 6, 2010 at <<http://www.cs.uiuc.edu/homes/iendres2/publications/cvpr2009_att.pdf>>, IEEE Computer Society, Proceedings of Conference on Computer Vision and Pattern Recognition (CVPR), 2009, 8 pages.

Felzenszwalb, et al., "Efficient Graph-Based Image Segmentation", retrieved on Sep. 6, 2010 at <<http://people.cs.uchicago.edu/~pff/papers/seg-ijcv.pdf>>, Kluwer Academic Publishers, International Journal of Computer Vision, vol. 59, No. 2, Sep. 2004, pp. 167-181.

Fergus, et al., "Object Class Recognition by Unsupervised Scale-Invariant Learning", retrieved on Sep. 6, 2010 at <<http://people.csail.mit.edu/fergus/papers/fergus03.pdf>>, IEEE Conference on Computer Vision and Pattern Recognition (CVPR), vol. 2, 2003, pp. 264-271.

Ferrari, et al., "Learning Visual Attributes", retrieved on Sep. 6, 2010 at <<http://www.robots.ox.ac.uk/~vgg/publications/papers/ferrari07.pdf>>, Proceedings of Advances in Neural Information Processing Systems (NIPS), Vancouver, Canada, 2007, pp. 1-8.

Goodrum, et al., "Image searching on the excite web search engine", retrieved on Sep. 6, 2010 at <<http://eprints.qut.edu.au/5007/1/5007.pdf>>, Information Processing and Management, vol. 37, No. 2, 2001, pp. 295-312.

Gupta, et al., "Beyond Nouns: Exploiting Prepositions and Comparative Adjectives for Learning Visual Classifiers", retrieved on Sep. 6, 2010 at <<http://www.umiacs.umd.edu/~agupta/eccv2008_beyondNouns.pdf>>, Springer-Verlag Berlin, Lecture Notes in Computer Science vol. 5302, Proceedings of European Conference on Computer Vision, Marseille, France, 2008, pp. 16-29.

Hansen, et al., "Memory modulates color appearance", retrieved on Sep. 6, 2010 at <<http://cvcl.mit.edu/SUNSeminar/HansenOlkkonen-color-memory-NN06.pdf>>, Nature Publishing Group, nature neuroscience, vol. 9, No. 11, Nov. 2006, pp. 1367-1368.

Hua, et al., "Online Multi-Label Active Annotation: Towards Large-Scale Content-Based Video Search", retrieved on Apr. 16, 2010 at <<http://delivery.acm.org/10.1145/1460000/1459379/p141-hua.pdf?key1=1459379&key2=5187141721&coll=GUIDE&dl=GUIDE&CFID=84519982&CFTOKEN=98986135>>, ACM, Proceeding of Conference on Multimedia (MM), Oct. 2008, pp. 141-150.

Ivanov, et al., "Object-based Tag Propagation for Semi-Automatic Annotation of Images", retrieved on Sep. 6, 2010 at <<http://infoscience.epfl.ch/record/143543/files/Ivanov_201003_ACM-MIR2010.pdf>>, ACM, Proceedings of International Conference on Multimedia Information Retrieval (MIR), Philadelphia, Pennsylvania, Mar. 2010, pp. 497-505.

Jansen, et al., "How are we searching the world wide web?: A comparison of nine search engine transaction logs", retrieved on Sep. 6, 2010 at <<http://eprints.qut.edu.au/4945/1/4945_1.pdf>>, Elsevier Press, Information Processing and Management, vol. 42, No. 1, 2006, pp. 248-263.

Lampert, et al., "Learning to Detect Unseen Object Classes by Between-Class Attribute Transfer", retrieved on Sep. 6, 2010 at <<http://www.kyb.mpg.de/publications/attachments/CVPR2009-Lampert_%5B0%5D.pdf>>, IEEE Conference on Computer Vision and Pattern Recognition (CVPR), Miami, Florida, Jun. 2009, pp. 951-958.

Li, et al., "Annotating Images by Harnessing Worldwide User-Tagged Photos", retrieved on Sep. 6, 2010 at <<http://staff.science.uva.nl/~xirong/pub/ICASSP09.pdf>>, IEEE Computer Society, Proceedings of International Conference on Acoustics, Speech and Signal Processing (ICASSP), 2009, pp. 3717-3720.

Li, et al., "Real-Time Computerized Annotation of Pictures", retrieved on Sep. 6, 2010 at <<http://ieeexplore.ieee.org/stamp/stamp.jsg?arnumber=04420087>>, IEEE Transactions on Pattern Analysis and Machine Intelligence, vol. 30, No. 6, Jun. 2008, pp. 985-1002.

Liu, et al., "Label to Region by Bi-Layer Sparsity Priors", retrieved on Sep. 6, 2010 at <<http://lms.comp.nus.edu.sg/papers/video/2009/acmmm09-liu.pdf>>, ACM, Proceedings of International Conference on Multimedia (MM), Beijing, China, Oct. 2009, pp. 115-124.

Lv, et al., "Image Semantic Search Engine", retrieved on Sep. 6, 2010 at <<http://ieeexplore.ieee.org/stamp/stamp.jsp?tp=&arnumber=5207793>>, IEEE Computer Society, Proceedings of International Workshop on Database Technology and Applications, 2009, pp. 156-159.

Maron, et al., "A Framework for Multiple-Instance Learning", retrieved on Sep. 6, 2010 at <<http://people.csail.mit.edu/tlp/publications/maron98framework.pdf>>, MIT Press, Proceedings of Conference on Advances in Neural Information Processing Systems (NIPS), Denver, Colorado, 1997, pp. 570-576.

Ojala, et al., "Gray Scale and Rotation Invariant Texture Classification with Local Binary Patterns", retrieved on Sep. 6, 2010 at <<http://www.mediateam.oulu.fi/publications/pdf/6.pdf>>, Springer-Verlag London, Lecture Notes in Computer Science vol. 1842, Proceedings of European Conference on Computer Vision, 2000, pp. 404-420.

Robertson, et al., "Okapi at TREC 4", retrieved on Sep. 6, 2010 at <<http://citeseerx.ist.psu.edu/viewdoc/download?doi=10.1.1.49.3311&rep=rep1&type=pdf>>, Proceedings of Text REtrieval Conference (TREC), 1996, pp. 73-96.

Rorissa, "User-generated descriptions of individual images versus labels of groups of images: A comparison using basic level theory", Information Processing & Management, vol. 44, No. 5, May 7, 2008, pp. 1741-1753.

Rosch, et al., "Basic Objects in Natural Categories", retrieved on Sep. 6, 2010 at <<http://citeseerx.ist.psu.edu/viewdoc/download?doi=10.1.1.149.3392&rep=rep1&type=pdf>>, Academic Press Inc., Cognitive Psychology, vol. 8, 1976, pp. 382-439.

Sigurbjornsson, et al., "Flickr Tag Recommendation based on Collective Knowledge", retrieved on Sep. 6, 2010 at <<http://www2008.org/papers/pdf/p327-sigurbjornssonA.pdf>>, ACM, Proceedings of International World Wide Web Conference (WWW), Beijing, China, Apr. 2008, pp. 327-336.

Smith, et al., "Automated Binary Texture Feature Sets for Image Retrieval", retrieved on Sep. 6, 2010 at <<http://citeseerx.ist.psu.edu/

(56) References Cited

OTHER PUBLICATIONS viewdoc/download?doi=10.1.1.18.9943&rep=rep1&type=pdf>>, IEEE Computer Society, Proceedings of International Conference on Acoustics, Speech, and Signal Processing (ICASSP), Atlanta, Georgia, 1996, pp. 2239-2242.

Smith, et al., "VisualSEEk: a fully automated content-based image query system", retrieved on Sep. 6, 2010 at <<http://citeseerx.ist.psu.edu/viewdoc/download?doi=10.1.1.45.884&rep=rep1&type=pdf, ACM, Conference on Multimedia (MM), Boston, Massachusetts, Nov. 1996, pp. 87-98.

Sorokin, et al., "Utility data annotation with Amazon Mechanical Turk", retrieved on Sep. 6, 2010 at <<http://ieeexplore.ieee.org/stamp/stamp.jsp?tp=&arnumber=4562953>>, IEEE, Internet Vision Workshop (CVPR), 2008, 8 pages.

van de Weijer, et al., "Learning Color Names from Real-World Images", retrieved on Sep. 6, 2010 at <<http://lear.inrialpes.fr/people/vandeweijer/papers/cvpr07.pdf>>, IEEE Press, Transactions on Image Processing, vol. 18, No. 7, Jul. 2009, pp. 1512-1523.

Viola, et al., "Rapid Object Detection using a Boosted Cascade of Simple Features", retrieved on Sep. 6, 2010 at <<http://userweb.cs.utexas.edu/~grauman/courses/spring2007/395T/papers/viola_cvpr2001.pdf>>, IEEE Computer Society, Proceedings of Conference on Computer Vision and Pattern Recognition (CVPR), vol. 1, 2001, pp. I-511-I-518.

von Ahn, et al., "Labeling Images with a Computer Game", retrieved on Sep. 6, 2010 at <<http://www.cs.cmu.edu/~biglou/ESP.pdf>>, ACM, Proceedings of Conference on Human Factors in Computing Systems (CHI), Vienna, Austria, Apr. 2004, pp. 319-326.

Wang, et al., "AnnoSearch: Image Auto-Annotation by Search", retrieved on Sep. 6, 2010 at <<http://citeseerx.ist.psu.edu/viewdoc/download?doi=10.1.1.68.5758&rep=rep1&type=pdf>>, IEEE Computer Society, Proceedings of Conference on Computer Vision and Pattern Recognition (CVPR), 2006, pp. 1483-1490.

Wang, et al., "Color-Structured Image Search", retrieved on Sep. 6, 2010 at <<http://research.microsoft.com/pubs/81527/TR-SearchByColor.pdf>>, Microsoft Corporation, Microsoft Research, Technical Report MSR-TR-2009-82, Jul. 7, 2009, 23 pages.

Wang, et al., "Joint learning of visual attributes, object classes and visual saliency", retrieved on Sep. 6, 2010 at <<https://netfiles.uiuc.edu/gwang6/www/WangForsyth2009a.pdf>>, IEEE International Conference on Computer Vision, Kyoto, Japan, 2009, pp. 537-544.

Weber, et al., "Unsupervised Learning of Models for Recognition", retrieved on Sep. 6, 2010 at <<http://www.vision.caltech.edu/CNS179/papers/Perona00.pdf>>, Springer-Verlag London, Lecture Notes in Computer Science vol. 1842, Proceedings of European Conference on Computer Vision, 2000, pp. 18-32.

Weinberger, et al., "Resolving Tag Ambiguity", retrieved on Sep. 6, 2010 at <<research.yahoo.com/files/ctfp6043-weinberger.pdf>>, ACM, Proceeding of International Conference on Multimedia (MM), Vancouver, Canada, Oct. 2008, pp. 111-120.

White, et al., "Similarity Indexing: Algorithms and Performance", retrieved on Sep. 6, 2010 at <<http://citeseerx.ist.psu.edu/viewdoc/download?doi=10.1.1.48.5758&rep=rep1&type=pdf>>, Proceedings of SPIE Storage and Retrieval for Image and Video Databases, vol. 2670, San Jose, California, 1996, pp. 62-75.

Zhang, et al., "EM-DD: An Improved Multiple-Instance Learning Technique", retrieved on Sep. 6, 2010 at <<http://citeseerx.ist.psu.edu/viewdoc/download?doi=10.1.1.16.5316&rep=rep1&type=pdf>>, MIT Press, Proceedings of Advances in Neural Information Processing Systems (NIPS), 2001, pp. 1073-1080.

Peters, "Folksonomies: Indexing and Retrieval in the Web 2.0", Walter de Gruyter & Co., Hawthorne, NJ, USA, 2009, pp. 1-443.

Thompson, "Colour Vision: A Study in Cognitive Science and the Philosophy of Perception", Routledge, Mar. 1995, pp. 1-354.

\* cited by examiner

TAG ASSOCIATION WITH IMAGE REGIONS

BACKGROUND

With the advent of the Internet, users are increasingly sharing images with one another. Often, these images are shared through social networks, personal web pages, or image search services that allow users to share pictures. Because the web sites offering these images often store a vast number of images, mechanisms for searching for and retrieving images have been developed. One such mechanism utilizes low level features of the images themselves, categorizing images by their low level features and associating the features with searchable descriptors. Another mechanism utilizes image tags, such as image descriptors provided by users. These tags often include terms associated with the content of an image, such as "dog" for a picture of a dog. Tags also include other types of descriptors, such as a verb describing what is happening in a picture (e.g., "jumping"), an adjective (e.g., "beautiful"), or a term meaningful only to the user doing the tagging (e.g., a name of the dog).

Often, though, tags only describe a small part of an image, leading to image results that do not match user expectations. For example, a user may search for a balloon, hoping to find a picture of a large, blue balloon centered within the image. Most of the results received by the user will not match this expectation. Results might include any number of pictures where the balloons are difficult to see, out of the center of view, or have a different color. Even if the user were to search for "centered blue balloon," the results would not be substantially better. The reason for this is that there is a disconnect between tagging behavior and searching behavior. In tagging images, users tend to apply a single tag for each object in the image (e.g., balloon) without describing the attributes of the object (e.g., where the object is located, its color, its size, etc.). In contrast, users searching for an image tend to be looking for highly specific search results. Without tags describing these additional specifics, however, a tag-based search will return many images that do not meet user expectations.

SUMMARY

To improve the sets of tags associated with images, a computing device is configured to determine a region of an image that a tag of that image applies to and to determine attribute tags describing that region. In determining the region that a tag applies to, the computing device calculates metrics for each combination of region and tag and associates one of the tags of the image with the region based at least in part on the metrics. In determining the attribute tags, the computing device utilizes one or both of the content or the context of the region. Also, the determined attribute tags include one or more of a location tag, a size tag, a dominance tag, a color tag, a texture tag, or a shape tag. The resulting tag and attribute tags are then associated with each other by the computing device to enable searching in an image search service based on an image query that includes the tag and one or more of the attribute tags. As a result, more accurate image search results are provided to the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Described herein are techniques for determining image tags associated with image regions and attribute tags describing those image regions. A computing device implementing the techniques first determines for one or more regions of an image which of the tags of that image are associated with those regions. Performing this determining may include determining for each combination of one of the regions with one of the tags a measure of diverse density in each of a plurality of feature spaces. The computing device may then select a highest measurement of diverse density calculated for each combination as a diverse density measurement for the combination and associate one of the tags with the region based at least in part on the diverse density measurements for the combinations of the region with the plurality of tags. If the highest diverse density measurement for the one or more regions is below a threshold, then a default tag is associated with the one or more regions. Also, the computing device may combine adjacent regions of the image that share a same tag or tags into a single region.

In various implementations, after the computing device has determined the tag or tags associated with the one or more regions, the computing device determines attribute tags for the one or more regions. The attribute tags are determined based at least in part on one or both of content of the one or more regions or context of the one or more regions within the image. In some implementations, the attribute tags include at least one of a location tag, a size tag, a dominance tag, a color tag, a texture tag, or a shape tag. The computing device may determine the location tag based on a relative position of the one or more regions within the image. The size tag may be determined by the computing device based on a sum of area-ratios of the one or more regions. Further, the computing device may determine the dominance tag based on diversity density measures and area-ratios of the one or more regions. Additionally, the computing device may determine the color tag, texture tag, or shape tag based on diverse density measurements for the one or more regions in a color space, a texture space, or a shape space, respectively. In some embodiments, the computing device determines these attribute tags for only one of the one or more regions, such as a region having the highest diverse density measurement.

Once the computing device has determined the tag-to-region associations and the attribute tags for regions, the computing device associates the attribute tags for a region with the tag or tags of that region and provides these associated tags (which include the tag and attribute tags) to an image search service. In some implementations, the computing device determining the tag-to-region associations and the attribute tags may be part of the image search service. In other implementations, it may be a separate device in communication with a device or devices of the image search service.

Overview

Figure 1:
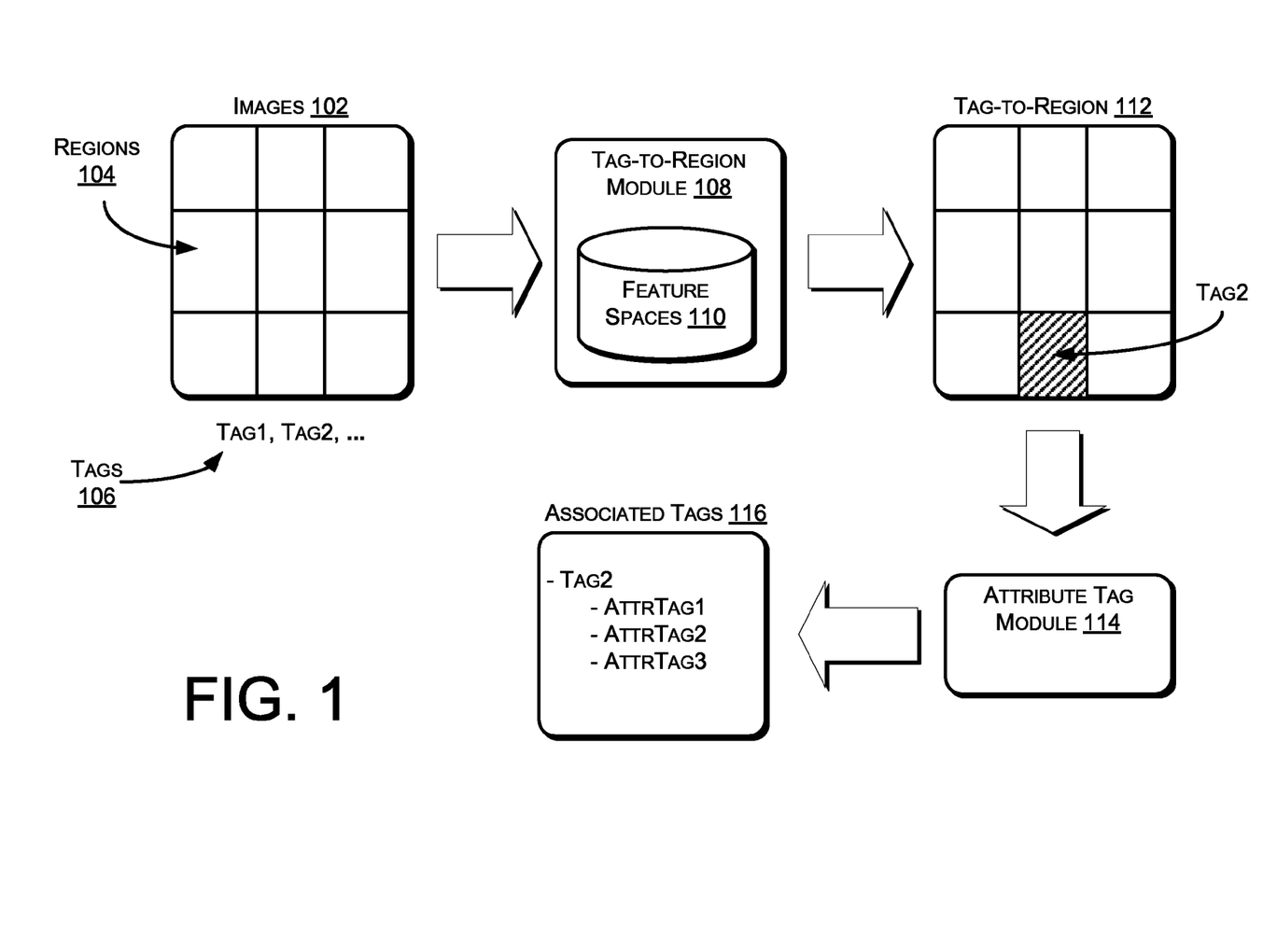
FIG. 1 is a block diagram showing an overview of a process for determining image tags associated with image regions and attribute tags describing the image regions, in accordance with various embodiments.

FIG. 1 shows an overview of a process for determining image tags associated with image regions and attribute tags describing the image regions, in accordance with various embodiments. As shown in FIG. 1, images 102 are each comprised of a plurality of regions 104 and are each associated with tags 106. The images 102 and tags 106 may be processed by a tag-to-region module 108 that utilizes feature spaces 110 to determine tag-to-region associations 112. The tag-to-region associations 112 associate tags 106 to specific regions 104 of the images 102. An attribute tag module 114 may then determine attribute tags associated with regions 104 of the images 102. The determined attribute tags of a region 104 and the determined tag 106 of that region 104 are associated in a document including these associated tags 116. Either or both of the tag-to-region module 108 and the attribute tag module 114 may be modules of a computing device, the computing device receiving the images 102 and tags 106 and producing the document including the associated tags 116.

Figure 2:
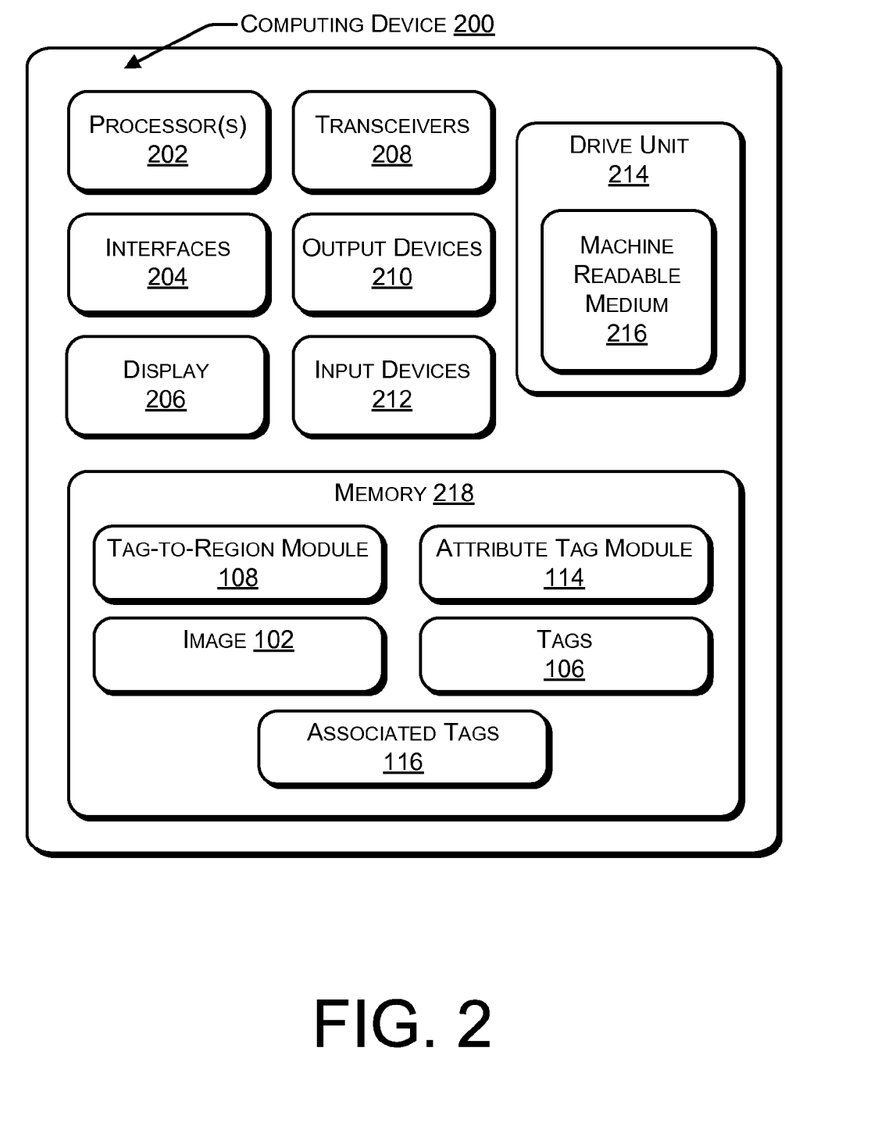
FIG. 2 is a block diagram showing an example computing device, in accordance with various embodiments.

In various implementations, a computing device that includes either or both of the tag-to-region module 108 and the attribute tag module 114 may be any sort of computing device. For example, the computing device may be a personal computer (PC), a laptop computer, a server or server farm, a mainframe, or any other sort of device. In one implementation, the modules and operations shown in FIG. 1 may be performed by a plurality of computing devices, such as a cloud computing network of nodes, rather than a single computing device. While the following discussion of FIG. 1 refers to a single "computing device" having the modules 108 and 114 and performing the operations shown in FIG. 1, those of skill in the art will understand that these modules and operations may be possessed and performed by multiple computing devices. An example computing device is illustrated in FIG. 2 and is described below in greater detail with reference to that figure.

Figure 6:
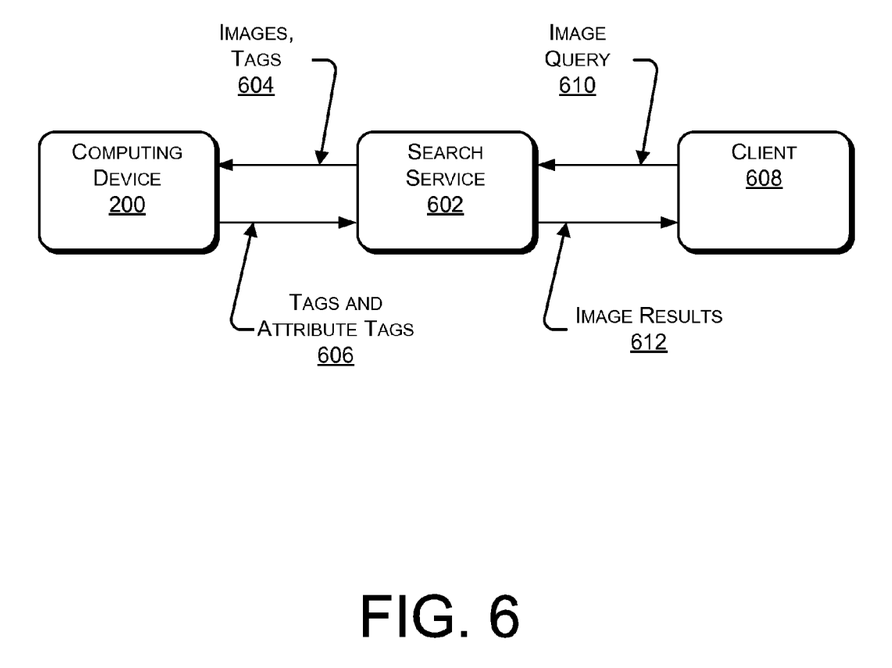
FIG. 6 is a block diagram showing an example implementation using the associated image tags and attribute tags in an image search service, in accordance with various embodiments.

In some implementations, the computing device receives images 102 and the associated tags 106 of each image 102. These images 102 and tags 106 may be stored locally on the computing device and may be received from another program or component of the computing device. In other implementations, the images 102 and tags 106 may be received from another computing device or other computing devices. In such other embodiments, the device or devices and the computing device may communicate with each other and with other devices via one or more networks, such as wide area networks (WANs), local area networks (LANs), or the Internet, transmitting the images 102 and tags 106 across the one or more networks. Also, the other computing device or devices may be any sort of computing device or devices. In one implementation, the other computing device or devices are associated with an image search service or a social network. Such other devices are shown in FIG. 6 and described in greater detail below with reference to that figure.

In various implementations, images 102 may be any sort of images known in the art. For example, images 102 could be still images or frames of a video. The images 102 may be of any size and resolution and may possess a range of image attributes known in the art.

The regions 104 of each image 102 may be of any size, shape, and number. In some implementations, each region 104 corresponds to an object or component included in the image 102. For example, in an image 102 showing a balloon and sky, the image 102 may have two regions 104: one for the balloon and another for the sky. While FIG. 1 illustrates an image 102 divided into nine rectangular regions 104 of varying sizes, it is to be understood that regions 104 may have any range of shapes, sizes, and numbers different from the regions 104 shown in FIG. 1. In some implementations, the size, shape, and number of the regions 104 is determined at least in part by the tag-to-region module 108.

The tags 106 are each associated with one or more images 102 and are textual or numeric descriptors of all or parts of the images 102 that they are associated with. The tags shown in FIG. 1—"tag1" and "tag2"—are provided simply for the sake of illustration and do not limit the range or type of tags 106 associated with images 102. For example, if an image 102 depicts a dog looking at a boy, then the tags 106 for that image 102 may include "dog," "boy," "Fido," "Lloyd," "ruff," "staring," "friendly," "2," or any other terms, phrases, or numbers. Note that in this example, tags 106 such as "boy" and "dog" each apply to only a part of the image 102, which may be a region 104 of the image 102. The received association, however, is between each tag 106 and the whole image 102.

The images 102 and tags 106 may be received in any sort of format establishing the relations between the images 102 and tags 106. For example, the images 102 may each be referred to in an extensible markup language (XML) document that provides identifiers of the images 102 or links to the images 102 and that lists the tags 106 for each image 102.

In various implementations, as mentioned above, the tag-to-region module 108 processes the received images 102 and tags 106 to apply the tags 106 to regions 104 of the images 102. In order to apply the tags 106, the tag-to-region module 108 first determines the features comprising feature spaces 110. In some implementations, each feature space 110 corresponds to a low-level feature of an image 102, such as color, texture, or shape. The features of the feature spaces 110 utilized by the tag-to-region module 108 may each be a low-level feature of a region 102 (e.g., a color of a region 104). These features of the feature spaces 110 are either received with the images 102 and tags 106 by the computing device or are determined by the tag-to-region module 108 utilizing image analysis techniques known in the art that are capable of calculating low-level features. In some implementations, the tag-to-region module 108 also makes an initial division of the images 102 into regions 104 in order to determine features for the regions 104. Such a division may be made using known graph segmentation algorithms. Once the tag-to-region module 108 has determined the features, the tag-to-region module 108 may store the features in any sort of format, such as a database, a file, or any other sort of data structure.

In some implementations, after determining or receiving the features comprising feature spaces 110, the tag-to-region module 108 determines a first set of regions 104. As mentioned above, the tag-to-region module 108 may have determined these regions 104 in the process of determining the features of the feature spaces 110. In other implementations, the tag-to-region module 108 determines a different or additional set of regions 104 subsequent to determining the features. Also, as mentioned above, the tag-to-region module 108 may determine the first set of regions 104 utilizing graph segmentation algorithms that are known in the art.

In various implementations, the tag-to-region module 108 then determines for each region 104 a tag 106 of the image 102 including that region 104 that best describes the region 104. To determine the tag 106, the tag-to-region module 108 calculates diverse density measurements for combinations of the region 104 and each of the tags 106 of the image 102 in each of the plurality of feature spaces. Diverse density measurements indicate for a "point" how many positive "bags" have "instances" near that point and how far negative instances are from that point. As used herein, the "point" refers to the region 104 being processed by the tag-to-region module 108, the "bags" refer to the images 102, each image 102 being a "bag," and the "instances" refer to other regions 104.

To calculate these diverse density measurements, the tag-to-region module 108 defines the region 104 being processed as x, the images 102 and tags 106 as a set D= $\{B_i, T_i\}_{i=1}^{N}$, where N is the total number of images 102, $B_i = \{B_{i1}, B_{i2}, \ldots, B_{im}\}$ represents an image $B_i$, and $B_{ij}$ represents an image region 104 of the first set of image regions 104 determined by the tag-to-region module 108. The tag-to-region module 108 also defines the set of tags for an image $B_i$ as $T_i = \{T_{i1}, T_{i2}, \ldots, T_{im}\}$. The features for each region $B_{ij}$ are defined as a feature set F={color, texture, shape} that gives low-level image features for $B_{ij}$. The diverse density measurement for each combination of x with a tag t in a feature space f is given by the formula (First Formula):

$$DD(x, t, f; D) = \frac{\sum_{1 \le i \le N, t \in T} P(x^f | B_i^f) + \sum_{1 \le i \le N, t \notin T} (1 - P(x^f | B_i^f))}{N}$$

where DD(–; D) means the diverse density using bags (images 102) from set D, and $P(x^f|B_i^f)$ is defined as:

$$P(x^f | B_i^f) \propto \max_j \exp\left(-\frac{|B_{ij}^f - x^f|^2}{\sigma^2}\right)$$

where σ is a parameter. Because the computational cost for the First Formula may be high, the tag-to-region module 108 may instead approximate $P(x^f|B_i^f)$. For example, tag-to-region module 108 may approximate $P(x^f|B_i^f)$ as:

$$P(x^f | B_i^f) \propto \max_j \exp\left(-\frac{|B_{ij}^f - x^f|^2}{\sigma^2}\right) \approx \delta[x^f \sim B_i^f]$$

where δ[expression] is set to 1 when the expression is true and 0 when the expression is false. $x^f \sim B_i^f$ means bag/image $B_i$ and instance/region x are "near" in feature space f, where "near" means that x has any instance/region of $B_i$ as its k-Nearest Neighbor or that any instance/region of $B_i$ cites x as its k-Nearest Neighbor in feature space f. Utilizing the approximation of $P(x^f|B_i^f)$, the tag-to-region module 108 can approximate First Formula in the following formula (Second Formula):

$$DD(x, t, f; D) \approx \frac{\sum_{1 \le i \le N, t \in T} \delta[x^f \sim B_i^f] + \sum_{1 \le i \le N, t \notin T} (1 - \delta[x^f \sim B_i^f])}{N}$$

In some implementations, the tag-to-regions module 108 then calculates diverse density measurements for each combination of region x and tag t in feature space f using the First Formula or approximates the calculation using the Second Formula. Once the tag-to-regions module 108 has obtained the diverse density measurements or approximations for a region x and tag t, the tag-to-regions module 108 selects the highest diverse density measurement or approximation as the diverse density measurement for that combination of region x and tag t. For example, if F includes three feature spaces f, the tag-to-regions module 108 will obtain three diverse density measurements/approximations for region x and tag t, one for each of the three feature spaces f. Of these three measurements/approximations, the tag-to-regions module 108 selects the measurement having the greatest magnitude (i.e., the "highest" measurement) and assigns this measurement/approximation as the diverse density measurement of the combination of region x and tag t.

Because the image 102 including region x may have a plurality of tags 106, the tag-to-regions module 108 calculates diverse density measurements for combinations of region x and each of the tags 106. Once the tag-to-regions module 108 has calculated these diverse density measurements, the tag-to-regions module 108 determines the combination of region x and a tag 106 that has the highest diverse density measurement. For example, if there are three tags, "boy," "dog," and "balloon," the tag-to-regions module 108 may determine that the combination of region x and dog has the highest diverse density measurement. In response to making this determination, the tag-to-regions module 108 associates the tag 106 from the combination having the highest diverse density measurement with the region x (e.g., associates "dog" with region x).

In one implementation, if the highest diverse density measurement for region x is below a threshold, then the tag-to-regions module 108 assigns a default tag, such as "Background" to the region x rather than any of the tags 106.

In various embodiments, the tag-to-regions module 108 performs the above-described operations for each region 104 of each image 102, associating a tag 106 with each region 104. The tag-to-regions module 108 may then merge regions 104 that are adjacent to one another and that share a tag 106 into a single region 104. As a result, the first set of regions 104 determined by the tag-to-regions module 108 may be transformed into a second set of regions 104. The regions 104 of the first set may all have approximately the same shape and size and might not correspond to objects in an image 102. The regions 104 of the second set may have differing shapes and sizes and may approximately correspond to the objects in an image 102. Thus, in an image 102 showing a balloon, a cloud, and sky and having "balloon," "cloud," and "sky" as tags 106, the second set of regions 104 may include three regions 104, each corresponding approximately to one of the balloon, cloud, and sky and each being associated with one of the tags 106. These regions 104 of the second set and their associated tags 106 represent the tag-to-region associations 112. These tag-to-region associations 112 may be represented in any sort of form, such as an XML document, a database record, a file, or any sort of data structure. In some implementations, the tag-to-region associations 112 also include associations of tags 106 and the first set of regions 104. In such implementations, the tag-to-region associations 112 may also store a diverse density measurement for each region 104 in the first set of regions, the stored diverse density measurement being associated with a tag t and a feature space f, as described above. In one implementation, the tag-to-regions associations 112 may store all of the diverse density measurements calculated by the tag-to-region module 108.

In various implementations, the attribute tag module 114 either receives the tag-to-region associations 112 from the tag-to-region module 108 or retrieves the tag-to-region associations 112 from storage. Once the tag-to-region associations 112 are received or retrieved, the attribute tag module 114 determines one or more attribute tags for each tag 106 of an image 102 based at least in part on content or context of the one or more regions 104 associated with that tag 106 by the tag-to-region associations 112. Because a tag 106 may be associated with multiple regions 104 of an image 102, the attribute tag module 114 may select one of the multiple regions 104 to determine attribute tags for. One region 104 is selected for each tag 106 because the regions 104 may have varying characteristics (e.g., one is colored brown, another blue, but both associated with the tag "coat"). So that each tag 106 is associated with only a single attribute tag of a specific type (e.g., only associated with one color tag), the attribute tag module 114 selects the region 104 having the highest diverse density measurement. That region 104 is then used in determining attribute tags to associate with the tag 106.

In some implementations, the attribute tag module 114 determines six attribute tags for each region 104: a location tag, a size tag, a dominance tag, a color tag, a texture tag, and a shape tag. In other implementations, the attribute tag module 114 determines additional attribute tags or fewer attribute tags. For example, the attribute tag module 114 could also determine one or more of a motion tag, a view tag, or an affection tag. In one implementation, these additional tags may be determined with reference to one or more corresponding features spaces, analogous to the manner in which a color tag is determined with reference to a color feature space.

To determine a location tag for tag 106, the attribute tag module 114 first determines coordinates or some other manner of locating the region 104 associated with the tag 106 within the image 102. In one implementation, the attribute tag module 114 may then simply assign those coordinates or location information as a value of a location tag for the tag 106. In other implementations, the location tag could have one of a set of string values, such as "top-left," "above," "top-right," "left," "center," "right," "bottom-left," "below," "bottom-right." These string values may in turn each be associated with a grid location of a grid pattern applied to the image 102. To determine the appropriate one of these string values, the attribute tag module 114 may determine where the coordinates/location information of the region 104 associated with the tag 106 falls within the grid pattern. For example, if the region 104 is located in the same place as the grid location associated with the string value "right," then the location tag associated with the tag 106 is assigned the value "right."

In some embodiments, to determine a size tag for tag 106, the attribute tag module 114 determines the relative size of the one or more regions 104 associated with the tag in the form of a ratio, a fraction, a decimal, or a percentage, and assigns that relative size as the value of a size tag for the tag 106. To calculate the relative size, the attribute tag module 114 sums the area-ratios of the one or more regions. For example, if the image 102 includes twenty total regions 104 of identical size, the area-ratio of each region 104 would be one-twentieth. If three such regions 104 were associated with a tag 106, the value of the size tag for that tag 106 would be three-twentieths.

To determine a dominance tag for tag 106, the attribute tag module 114 calculates for each region 104 associated with the tag 106 the product of the diverse density measurement for that region 104 and the area-ratio for that region 104. These per-region products are then summed for the tag 106, producing a dominance value which the attribute tag module 114 then assigns to the dominance tag for tag 106. The formula used by the attribute tag module 114 to calculate the dominance values is defined as follows:

$$D(t) = \sum_{p \in P_t} DD(x_p, t; D) A_p$$

where D(t) is the dominance value for tag t, p is a region 104 associated with tag t, $P_t$ is the set of regions 104 associated with tag t, $DD(x_p,t; D)$ is the measure of diverse density for p, and $A_p$ is the area-ratio for region p. The dominance is a measure of how important a tag appears in an image 102. In some implementations, the dominance values are associated with string values such as "not important," "moderately important," or "very important" based on numerical value ranges associated with the string values.

In various embodiments, the attribute tag module 114 determines the color tag for tag 106 in a manner analogous to that used by tag-to-region module 108 to determine the tag 106 associated with the region 104. In determining the color tag, however, the attribute tag module 114 utilizes a plurality of color tags rather than the set of tags 106 and utilizes a number of images known to be associated with each color tag. Thus, the set of images used by the attribute tag module 114 in determining the color tag includes the image 102 associated with the tag 106 and the other images known to be associated with the color tags. In some implementations, the set of color tags includes ten color values, such as "black," "blue," "brown," "green," "orange," "pink," "purple," "red," "white," and "yellow." Utilizing either the First Formula or the Second Formula of the tag-to-region module 108, the attribute tag module 114 calculates the diverse density measurements for combinations of the region 104 associated with the tag 106 and each color tag in a single color feature space (hereinafter "color space"), which may be included in feature spaces 110. The attribute tag module 114 then determines the combination of region 104 and color tag that has the highest diverse density measurement and associates the color tag of that combination with the tag 106.

The attribute tag module 114 determines the texture tag for tag 106 in a manner analogous to that used by tag-to-region module 108 to determine the tag 106 associated with the region 104. In determining the texture tag, however, the attribute tag module 114 utilizes a plurality of texture tags rather than the set of tags 106 and utilizes a number of images known to be associated with each texture tag. Thus, the set of images used by the attribute tag module 114 in determining the texture tag includes the image 102 associated with the tag 106 and the other images known to be associated with the texture tags. In some implementations, the set of texture tags includes thirteen texture values, such as "stripes," "spots," "skin," "furry," "clouds," "water," "grass," "tree," "bricks," "check," "tough_skin," "rock," and "wood." Utilizing either the First Formula or the Second Formula of the tag-to-region module 108, the attribute tag module 114 calculates the diverse density measurements for combinations of the region 104 associated with the tag 106 and each texture tag in a single texture feature space (hereinafter "texture space"), which may be included in feature spaces 110. The attribute tag module 114 then determines the combination of region 104 and texture tag that has the highest diverse density measurement and associates the texture tag of that combination with the tag 106.

In various embodiments, the attribute tag module 114 determines the shape tag for tag 106 in a manner analogous to that used by tag-to-region module 108 to determine the tag 106 associated with the region 104. In determining the shape tag, however, the attribute tag module 114 utilizes a plurality of shape tags rather than the set of tags 106 and utilizes a number of images known to be associated with each shape tag. Thus, the set of images used by the attribute tag module 114 in determining the shape tag includes the image 102 associated with the tag 106 and the other images known to be associated with the shape tags. In some implementations, the set of shape tags includes five shape values, such as "round," "rectangle," "triangle," "diamond," and "heart." Utilizing either the First Formula or the Second Formula of the tag-to-region module 108, the attribute tag module 114 calculates the diverse density measurements for combinations of the region 104 associated with the tag 106 and each shape tag in a single shape feature space (hereinafter "shape space"), which may be included in feature spaces 110. The attribute tag module 114 then determines the combination of region 104 and shape tag that has the highest diverse density measurement and associates the shape tag of that combination with the tag 106.

In some implementations, the results of the attribute tag module 114 in determining any of the above attribute tags may be compared to one or more thresholds, such as a threshold for each tag type (i.e., one threshold for color tags, another for texture tags). If the results for a tag type do not meet the threshold for that type, a default value, such as the string "not applicable" or "NA" may be associated with the attribute tag of that tag type.

Once the attribute tag module 114 has determined the attribute tags for each tag 106 of an image 102, the attribute tag module 114 generates a document for each tag 106 and its corresponding attribute tags listing both the tag 106 and the attribute tags for that tag. The documents can be of any form, such as XML documents, etc. These documents and the tags they include are shown in FIG. 1 as documents including "associated tags 116," associated tags 116 referring to these documents and the tag 106 and attribute tags that each includes. In some embodiments, each document includes a link or identifier of the image 102 that it is associated with.

In various embodiments, after generating the documents including the associated tags 116, the computing device provides the images 102 and the documents including the associated tags 116 to an image search service. If the image search service already has the images 102, then the computing device simply provides the documents including the associated tags 116 and a specification of the associations of the documents including the associated tags 116 with images 102 (e.g., an XML document) to the image search service. In one implementation, the documents including the associated tags 116 may include such specifications associating themselves with the images 102, as discussed above. The image search service may be implemented by the same device as the computing device having the tag-to-region module 108 and the attribute tag module 114 or may be implemented by a different device. An example implementation describing the use of the documents including the associated tags 116 by an image search service is shown in FIG. 6 and is described below with reference to that figure.

Example Computing Device

FIG. 2 illustrates an example computing device, in accordance with various embodiments. As shown, the computing device 102 may include processor(s) 202, interfaces 204, a display 206, transceivers 208, output devices 210, input devices 212, and drive unit 214 including a machine readable medium 216. The computing device 102 further includes a memory 218, the memory storing at least availability to the tag-to-region module 108, the attribute tag module 114, the image 102, the tags 106, and the associated tags 116.

In some embodiments, the processor(s) 202 is a central processing unit (CPU), a graphics processing unit (GPU), or both CPU and GPU, or any other sort of processing unit.

In various embodiments, the interfaces 204 are any sort of interfaces. Interfaces 204 include any one or more of a WAN interface or a LAN interface.

In various embodiments, the display 206 is a liquid crystal display or a cathode ray tube (CRT). Display 206 may also be a touch-sensitive display screen, and can then also act as an input device or keypad, such as for providing a soft-key keyboard, navigation buttons, or the like.

In some embodiments, the transceivers 208 include any sort of transceivers known in the art. The transceivers 208 facilitate wired or wireless connectivity between the computing device 200 and other devices.

In some embodiments, the output devices 210 include any sort of output devices known in the art, such as a display (already described as display 206), speakers, a vibrating mechanism, or a tactile feedback mechanism. Output devices 210 also include ports for one or more peripheral devices, such as headphones, peripheral speakers, or a peripheral display.

In various embodiments, input devices 212 include any sort of input devices known in the art. For example, input devices 212 may include a microphone, a keyboard/keypad, or a touch-sensitive display (such as the touch-sensitive display screen described above). A keyboard/keypad may be a multi-key keyboard (such as a conventional QWERTY keyboard) or one or more other types of keys or buttons, and may also include a joystick-like controller and/or designated navigation buttons, or the like.

The machine readable medium 216 stores one or more sets of instructions (e.g., software) embodying any one or more of the methodologies or functions described herein. The instructions may also reside, completely or at least partially, within the memory 218 and within the processor(s) 202 during execution thereof by the computing device 200. The memory 218 and the processor(s) 202 also may constitute machine readable media 216.

In various embodiments, memory 218 generally includes both volatile memory and non-volatile memory (e.g., RAM, ROM, EEPROM, Flash Memory, miniature hard drive, memory card, optical storage (e.g., CD, DVD), magnetic cassettes, magnetic tape, magnetic disk storage (e.g., floppy disk, hard drives, etc.) or other magnetic storage devices, or any other medium). Memory 218 can also be described as computer storage media and may include volatile and non-volatile, removable and non-removable media implemented in any method or technology for storage of information, such as computer readable instructions, data structures, program modules, or other data.

The tag-to-region module 108, attribute tag module 114, image 102, tags 106, and associated tags 116 shown as being stored in memory 218 are described above in detail with reference to FIG. 1.

Example Operations

Figure 3:
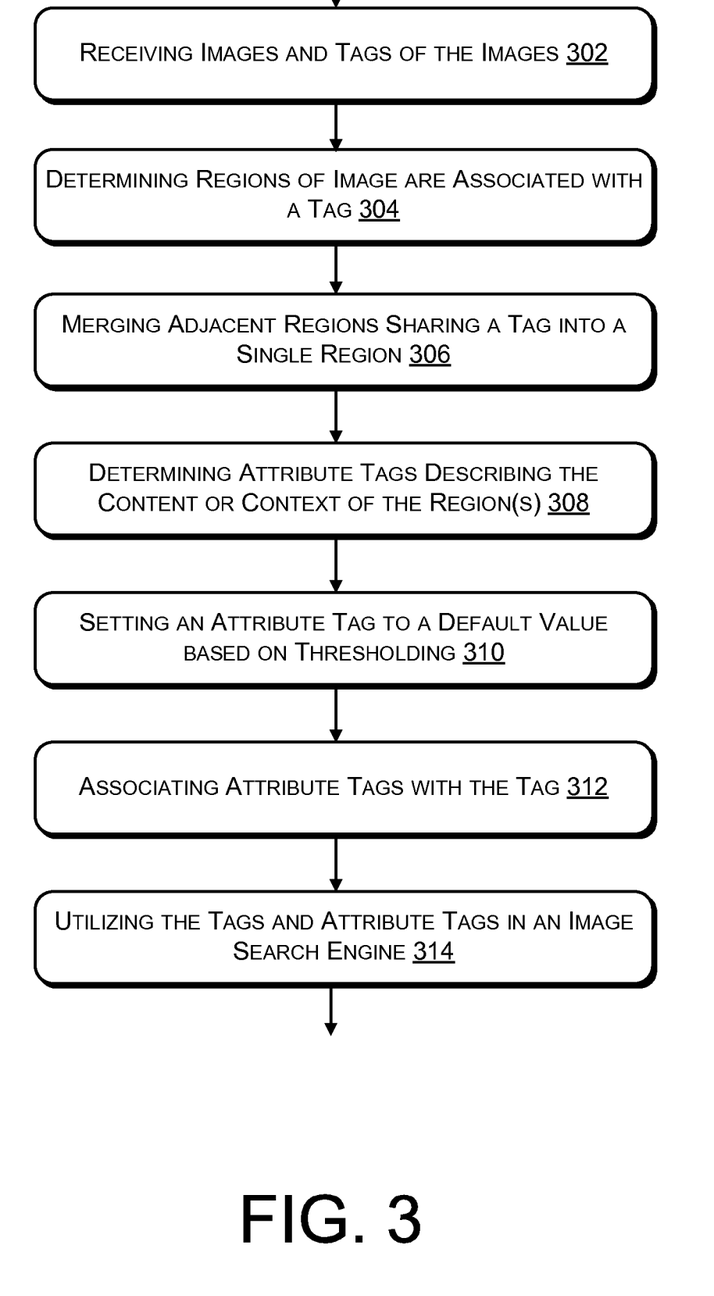
FIG. 3 is a flowchart showing example operations for determining image tags associated with image regions and attribute tags describing the image regions, in accordance with various embodiments.
Figure 4:
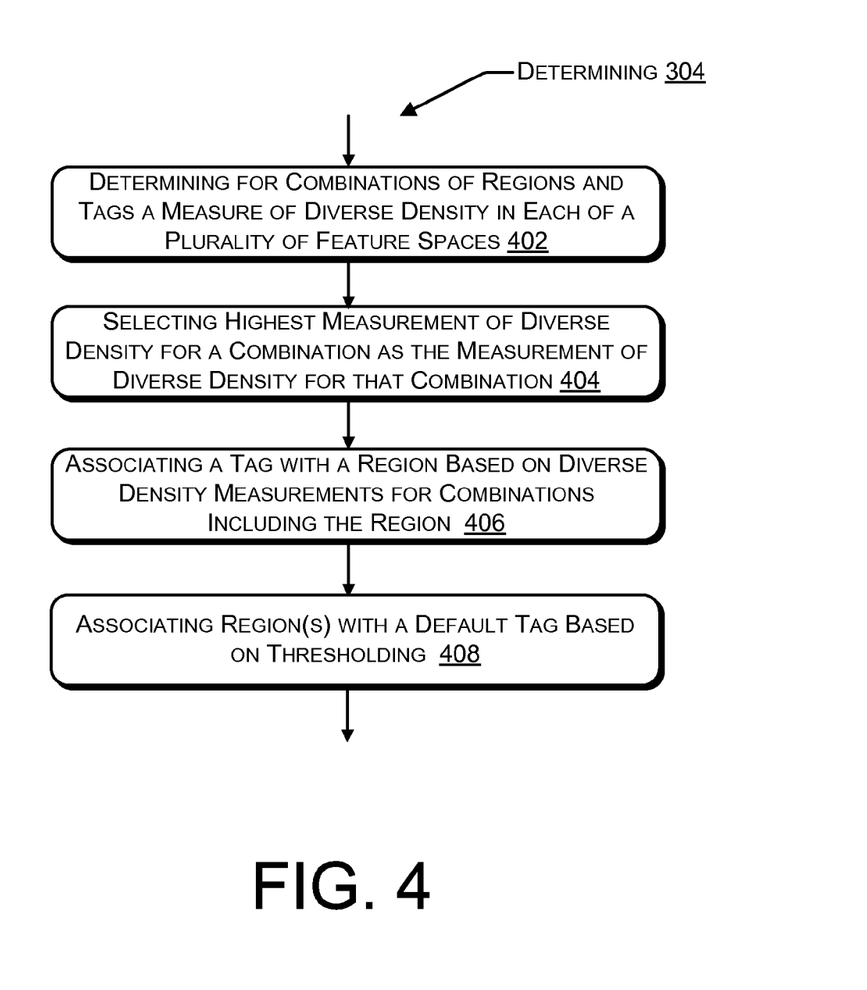
FIG. 4 is a flowchart showing example operations for determining image tags associated with image regions by utilizing measures of diverse density in a plurality of feature spaces, in accordance with various embodiments.
Figure 5:
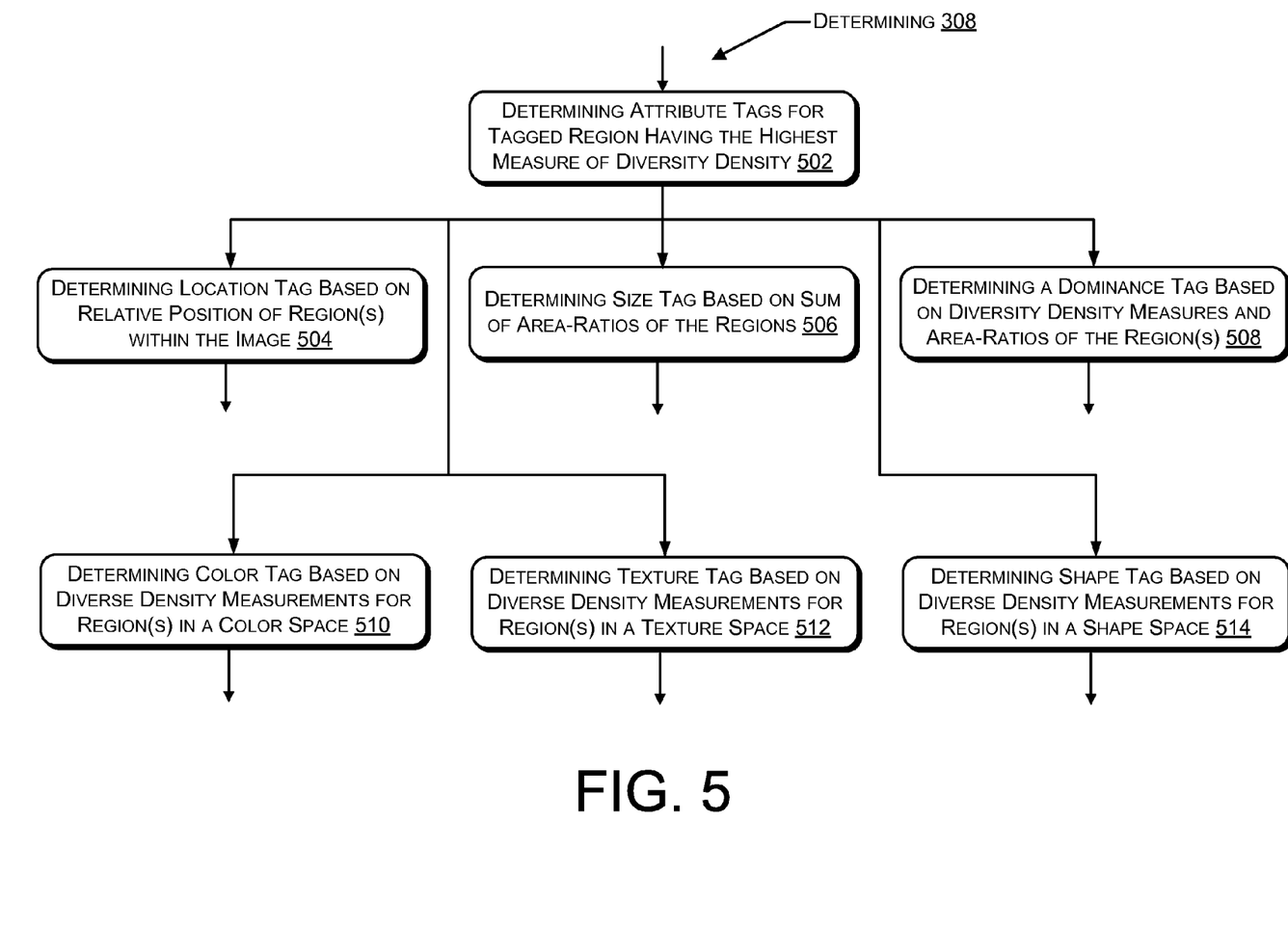
FIG. 5 is a flowchart showing example operations for determining attribute tags associated with image regions based at least on the content or context of the image regions, in accordance with various embodiments.

FIGS. 3-5 illustrate operations involved in determining image tags associated with image regions and attribute tags describing the image regions. These operations are illustrated in individual blocks and summarized with reference to those blocks. The operations may be performed in hardware, or as processor-executable instructions (software or firmware) that may be executed by one or more processors. Further, these operations may, but need not necessarily, be implemented using the arrangement of FIGS. 1 and 2. Consequently, by way of explanation, and not limitation, the method is described in the context of FIGS. 1 and 2.

FIG. 3 shows example operations for determining image tags associated with image regions and attribute tags describing the image regions, in accordance with various embodiments. As illustrated at block 302, a computing device 200 receives one or more images 102 and associated tags 106. As mentioned above, each image 102 comprises a plurality of regions 104.

At block 304, the computing device 200 determines that one or more regions 104 of an image 102 are associated with a tag 106 of the image 102. In some implementations, the determining may comprise determining a tag 106 that is associated with each region 104 of the plurality of regions 104 of the image 102. Determining the regions 104 may itself comprise a number of operations, such as those illustrated in FIG. 4 and described below with reference to that figure.

At block 306, the computing device 200 merges adjacent regions 104 of the image 102 sharing a tag 106 into a single region 104 of the image 102.

At block 308, the computing device 200 determines one or more attribute tags describing at least one of the content or context of the one or more regions 104. In some implementations, the attribute tags include at least one of a location tag, a size tag, a dominance tag, a color tag, a texture tag, a shape tag, a motion tag, a view tag, or an affection tag. Determining the attribute tags may itself comprise a number of operations, such as those illustrated in FIG. 5 and described below with reference to that figure.

At block 310, the computing device 200 sets one of the one or more attribute tags to a default value in response to determining based on thresholding that the selected attribute tag is not relevant.

At block 312, the computing device 200 associates the one or more attribute tags with the tag 106 to enable image searching based on the tag 106 and attribute tags.

At block 314, the computing device 200 utilizes the tags 106 and attribute tags in an image search engine.

FIG. 4 shows example operations for determining image tags associated with image regions by utilizing measures of diverse density in a plurality of feature spaces, in accordance with various embodiments. As illustrated at block 402, the computing device 200 determines for each combination of a region 104 of an image 102 with one of a plurality of tags 106 a measure of diverse density in each of a plurality of feature spaces 110. In some implementations, the plurality of feature spaces 110 include a color space, a texture space, and a shape space representing low-level features of the region 104 of the image 102.

At block 404, the computing device 200 selects a highest measurement of diverse density calculated for each combination of the region 104 and one of the plurality of tags 106 as a diverse density measurement for the combination of the region 104 and the one of the plurality of tags 106.

At block 406, the computing device 200 associates one of the plurality of tags 106 with the region 104 based at least in part on the diverse density measurements for the combinations of the region 104 with the plurality of tags 106. In some implementations, the associating comprises selecting the tag 106 associated with the region 104 that corresponds to the combination of the region 104 and the tag 106 having the highest measurement of diverse density.

At block 408, the computing device 200 associates the one or more regions 104 with a default tag 106 in response to determining that the highest magnitude measure of diverse density for the one or more regions 104 is below a threshold.

FIG. 5 shows example operations for determining attribute tags associated with image regions based at least on the content or context of the image regions, in accordance with various embodiments. As illustrated at block 502, the computing device 200 determines the one or more attribute tags describing the content or context of one of the one or more regions 104 that is associated with the highest magnitude measure of diverse density. After performing the determining at block 502, the computing device 200 may perform any one or more of the operations shown at blocks 504-514.

At block 504, the computing device 200 determines as a location tag of the attribute tags a relative position of the one or more regions 104 within the image 102.

At block 506, the computing device 200 determines a size tag of the attribute tags based on a sum of area-ratios of the one or more regions 104.

At block 508, the computing device 200 determines a dominance tag of the attribute tags based at least in part on a measure of diverse density of the one or more regions 104 and on area-rations of the one or more regions 104.

At block 510, the computing device 200 determines a color tag of the attribute tags based at least in part on diverse density measurements for the one or more regions 104 in a color space.

At block 512, the computing device 200 determines a texture tag of the attribute tags based at least in part on diverse density measurements for the one or more regions 104 in a texture space.

At block 514, the computing device 200 determines a shape tag of the attribute tags based at least in part on diverse density measurements for the one or more regions 104 in a shape space.

Example Implementation

FIG. 6 shows an example implementation using the associated image tags and attribute tags in an image search service, in accordance with various embodiments. As illustrated, a computing device 200 communicates with a search service 602 and receives images and tags 604 from the search service 602. The computing device 200 then performs operations such as those illustrated in FIGS. 3-5 and described above to produce the tags and attribute tags 606, which the computing device 200 provides to the search service 602. The search service 602 then communicates with one or more clients 608, receiving image queries 610 from the clients 608 and providing image results 612 to the clients 608.

In various implementations, the search service 602 is any sort of image search service known in the art, such as the Flickr™ image repository or Bing® image search. As mentioned above with regard to FIG. 1, images 104 and associated tags 106 may be received from any source, such as a search service 602. These received images 104 and tags 106 may comprise the images and tags 604. Also, the tags and attribute tags 606 provided to the search service 602 may be the documents including the associated tags 116 produced by the computing device 200 in the manner described above. The search service 602 may be implemented by a single computing device or a plurality of computing devices and may comprise a web site, a social network, a storage server, or any combination thereof. Also, the search service 602 and computing device 200 may communicate via any one or more networks, such as WAN(s), LAN(s), or the Internet. In one implementation, the search service 602 and computing device 200 may be implemented in the same or related computing devices.

The clients 608 communicating with the search service 602 may be any sort of clients known in the art. For example, clients 608 may comprise web browsers of computing devices. The clients 608 may provide image queries 610 to the search service 602. These image queries may have been entered by a user through, for example, a web page provided by the search service 602. In response, the search service may perform an image search on the images 604 using the tags and attribute tags 606 produced by the computing device 200. The search service 602 then provides image results 612 based on the image search to the clients 608. These image results 612 may be delivered, for instance, as a web page of ranked or unranked search results and may be displayed to users by the clients 608.

In some implementations the search service 602 ranks the image results based on metrics of the tag and attribute tags with which the image results are associated. These metrics may include the diverse density measurements associated with the tags 106, which are discussed above in detail with respect to FIG. 1. In some implementations, these diverse density measurements are communicated with the tag and tag attributes 606 to the search service 602.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
    receiving, by a computing device, an image having one or more image tags, wherein each image tag is associated with the image as a whole;
    identifying a plurality of regions of the image;
    associating, by the computing device, a particular region of the plurality of regions with a particular image tag of the one or more image tags;
    determining, by the computing device, that one or more attribute tags describe at least one of the content or context of the particular region based at least in part on determining that the one or more attribute tags are associated with a highest magnitude measurement of diverse density of the particular region; and
    associating, by the computing device, the one or more attribute tags with the particular image tag to enable image searching based on the image tag and the attribute tags.

2. The method of claim 1, wherein associating the particular region with the particular image tag includes calculating, for combinations of the particular region with individual image tags of the one or more image tags, a measurement of diverse density in individual feature spaces of a plurality of feature spaces, wherein the plurality of feature spaces represent one or more low level features of the particular regions.

3. The method of claim 1, wherein associating the particular region with the particular image tag includes calculating, for each combinations of the particular region and individual image tags of the one or more image tags, a measurement of diverse density in individual feature spaces of a plurality of feature spaces, wherein the plurality of feature spaces represent one or more low level features of the particular region; and further includes selecting, based at least in part on the plurality of feature spaces, a highest magnitude measurement of diverse density calculated for combinations of the particular region with individual image tags of the one or more image tags as a diverse density measurement for a combination of the particular region and the particular image tag of the one or more image tags.

4. The method of claim 3, further comprising associating the particular image tag with the particular region based at least in part on the measurement of diverse density for combinations of the particular region with the one or more image tags.

5. The method of claim 1, further comprising calculating, for combinations of the particular region and individual image tags of the one or more image tags, a measurement of diverse density in individual feature spaces of a plurality of feature spaces, wherein the plurality of feature spaces represent one or more low level features of the particular region; and associating one or more other regions of the plurality of regions of the image with a default image tag in response to determining that a highest magnitude measurement of diverse density for the one or more other regions is below a threshold.

6. The method of claim 1, further comprising merging adjacent regions of the image into a single region of the image when the adjacent regions share an image tag.

7. The method of claim 1, further comprising
    associating an image tag with each region of the plurality of regions.

8. The method of claim 1, wherein the attribute tags include a location tag for the particular region and the method further comprises determining as the location tag a position of the particular region relative to positions of one or more other regions of the plurality of regions of the image.

9. The method of claim 1, wherein the attribute tags include a size tag for the particular region and the method further comprises determining the size tag based on an area-ratio of the particular region.

10. The method of claim 1, wherein the attribute tags include a dominance tag for the particular region and the method further comprises determining the dominance tag based at least in part on a measurement of diverse density of the particular region and an area-ratio of the particular region.

11. The method of claim 1, wherein the attribute tags include a color tag for the particular region and the method further comprises determining the color tag based at least in part on diverse density measurements for the particular region in a color space.

12. The method of claim 1, wherein the attribute tags include a texture tag for the particular region and the method further comprises determining the texture tag based at least in part on diverse density measurements for the particular region in a texture space.

13. The method of claim 1, wherein the attribute tags include a shape tag for the particular region and the method further comprises determining the shape tag based at least in part on diverse density measurements for the particular region in a shape space.

14. The method of claim 1, further comprising setting a particular attribute tag of the one or more attribute tags to a default value in response to determining based on thresholding that the particular attribute tag is not relevant.

15. A computer-readable physical memory device comprising executable instructions stored on the computer-readable memory device and configured to program a computing device to perform operations including:

identifying an image having a plurality of image tags, wherein each image tag is associated with the image as a whole;

identifying a plurality of regions of the image;

calculating, for each combination of a region of the image with one of the plurality of image tags, a measurement of diverse density in each of a plurality of feature spaces, wherein the plurality of feature spaces represent one or more low level features of the region;

selecting a highest magnitude measurement of diverse density calculated for each combination of the region and one of the plurality of image tags as a diverse density measurement for the combination of the region and the one of the plurality of image tags; and associating one of the plurality of image tags with the region based at least in part on the diverse density measurements for the combinations of the region with the plurality of image tags.

16. The computer-readable physical memory device of claim 15, wherein the plurality of feature spaces include a color space, a texture space, and a shape space.

17. The computer-readable physical memory device of claim 15, wherein associating one of the plurality of image tags with the region comprises:

selecting an image tag that corresponds to the combination of the region and the image tag having the highest magnitude measurement of diverse density; and associating the image tag that is selected with the region.

18. A system comprising:

a processor;

a tag-to-region module comprising a plurality of instructions configured to be executed by the processor to perform operations including:

identifying an image having one or more image tags, wherein at least one of the one or more image tags is associated with the image as a whole;

identifying a plurality of regions of the image; and associating a particular region of the image with a particular image tag of the one or more image tags based at least in part on metrics for combinations of particular regions and image tags of the one or more image tags; and an attribute tag module comprising a plurality of instructions configured to be executed by the processor to perform operations including:

determining one or more attribute tags describing at least one of the content or context of the particular region associated with the image tag, the attribute tags being determined to be at least in part associated with a highest magnitude measurement of diverse density of the particular region; and associating the one or more attribute tags with the image tag to enable image searching based on the image tag and the attribute tags.

19. The system of claim 18, wherein the attribute tags further include one or more of a motion tag, a view tag, or an affection tag.

20. The system of claim 18, wherein the attribute tags include at least one of a location tag, a size tag, a dominance tag, a color tag, a texture tag, or a shape tag.

* * * * *